(12) United States Patent
Ko et al.

(10) Patent No.: US 7,859,683 B2
(45) Date of Patent: Dec. 28, 2010

(54) FAST THREE-DIMENSIONAL SHAPE MEASURING APPARATUS AND METHOD

(75) Inventors: Kuk-Won Ko, Seongnam-si (KR);
Young-Chul Kwon, Cheonan-si (KR)

(73) Assignee: Industry-University Cooperation Foundation Sunmoon University, Asan-si, Chungcheongnam-do (KR)

( * ) Notice: Subject to any disclaimer, the term of this patent is extended or adjusted under 35 U.S.C. 154(b) by 127 days.

(21) Appl. No.: 12/388,336

(22) Filed: Feb. 18, 2009

(65) Prior Publication Data
US 2009/0251708 A1 Oct. 8, 2009

(30) Foreign Application Priority Data
Apr. 4, 2008 (KR) ...................... 10-2008-0031602

(51) Int. Cl.
*G01B 11/02* (2006.01)
(52) U.S. Cl. ...................................................... 356/512
(58) Field of Classification Search ................. 356/511, 356/512
See application file for complete search history.

(56) References Cited

U.S. PATENT DOCUMENTS

| | | | |
|---|---|---|---|
| 5,589,938 A * | 12/1996 | Deck ........................... | 356/497 |
| 5,777,741 A * | 7/1998 | Deck ........................... | 356/511 |
| 6,856,405 B2 * | 2/2005 | Tang ........................... | 356/512 |
| 2004/0174526 A1 * | 9/2004 | Tang ........................... | 356/450 |
| 2007/0008551 A1 * | 1/2007 | Tang ........................... | 356/516 |
| 2008/0260204 A1 * | 10/2008 | Lee et al. ..................... | 382/100 |
| 2009/0251708 A1 * | 10/2009 | Ko et al. ...................... | 356/496 |

* cited by examiner

*Primary Examiner*—Patrick J Connolly
(74) *Attorney, Agent, or Firm*—Sherr & Vaughn, PLLC

(57) ABSTRACT

Disclosed herein is an apparatus for measuring the shape of a 3D object using an interferometer. The apparatus includes a light source unit, a beam splitter, a reference mirror, an actuator, an image pickup device, and a control unit. The light source unit emits light. The beam splitter divides the light from the light source unit. The reference mirror reflects light as a reference beam. The actuator moves the reference mirror. The image pickup device acquires a plurality of interference patterns by causing the reflected beam and the reference beam to interfere with each other. The control unit measures the shape of the object from the acquired interference patterns, outputs reference mirror drive signals to the actuator, and issues an image capture command at the end of image capture time that is shorter than settling time.

6 Claims, 4 Drawing Sheets

FAST THREE-DIMENSIONAL SHAPE MEASURING APPARATUS AND METHOD

CROSS REFERENCE TO PRIOR APPLICATIONS

This application claims priority to and the benefit of Korean Patent Application No. 10-2008-0031602 filed on Apr. 4, 2008, which is hereby incorporated by reference in its entirety.

BACKGROUND OF THE INVENTION

1. Field of the Invention

The present invention relates generally to a 3D shape measuring apparatus for acquiring interference patterns using an interferometer and measuring the shape of a three-dimensional (3D) object, and, more particularly, to a fast 3D shape measuring apparatus and method that is capable of acquiring a plurality of interference patterns within a short period of time, thereby enabling fast shape measurement.

2. Description of the Related Art

In general, an interferometer divides source light into a measurement beam and a reference beam using a beam splitter, causes the beams to be incident on a test surface and a reference mirror, respectively, and combines reflected beams using the beam splitter, thus creating an interference pattern including the height and shape information of the object to be measured. This interference pattern is input to a computer, which is a data processing unit, through respective pixels of a Charge-Coupled Device (CCD) camera in an area array in the form of digital values corresponding to the optical intensities of the interference pattern. Various methods ranging from the Carre's method, proposed by a French person Carre' in 1963, to the R+1 bucket, proposed in 1993, have been proposed as methods of extracting the height and shape information of a test surface using input digital values. These methods are each configured to acquire the height and shape information of an object to be measured from several interference patterns using a measurement algorithm. The basic principle of the methods is to acquire the height and shape information of a test surface by processing digital values corresponding to several interference patterns that are obtained by changing the optical path of source light in such a way as to move the reference mirror at specific regular phase intervals (for example, π/2, 2π/3 or the like) within one wavelength (=λ, 0~π) of the source light. In this case, a piezoelectric actuator PZT is used to change the location of the reference mirror. The piezoelectric actuator requires settling time during which the piezoelectric actuator is driven to move the reference mirror, and a plurality of interference patterns cannot be acquired until the settling time has elapsed. Here, the settling time is the time that it takes to stably reach a desired location until setting is completed when the piezoelectric actuator is driven to move the reference mirror, and is the time that it takes to perform setting attributable to the movement of the reference mirror and that ranges from the time at which the piezoelectric actuator starts to be driven to the time at which the piezoelectric actuator completes driving.

The above relationship will be described in detail below with reference to FIG. 1.

FIG. 1 is a graph showing the relationship between moving distance and time when the piezoelectric actuator is driven.

Referring to FIG. 1, the relationship between moving distance and time when voltage is applied and the piezoelectric actuator is driven is shown, and the horizontal axis of FIG. 1 denotes time t and the vertical axis thereof denotes moving distance d when the piezoelectric actuator is driven.

When voltage is applied, the piezoelectric actuator is driven, starts to be moved and is moved over the maximum distance in the maximum overshoot interval (which occurs at tmax), and the moving distance is reduced and reaches a point in a stable-state interval ds. The settling time ts is terminated at the time at which the piezoelectric actuator enters a stable state, and image capture starts after the settling time. The settling time during which movement over a specific distance is completed is denoted by ts in the graph. That is, it can be seen that it takes settling time ts for the piezoelectric actuator to start to be driven and complete driving.

The graph of FIG. 1 shows the control characteristics of a typical piezoelectric actuator when the piezoelectric actuator is driven. The terms 'maximum', 'settling time' and 'stable state' are terms that are widely used in the general control field.

That is, the driving of the piezoelectric actuator is determined to have been completed when driving voltage is applied, the piezoelectric actuator is driven, settling time ts has elapsed and a stable-state interval ds is reached after the settling time ts, and then an image capture signal for acquiring an image is transmitted.

Accordingly, since settling time, during which the piezoelectric actuator is driven to move the reference mirror in order to acquire a plurality of interference patterns, is required, each settling time is required whenever each of the interference patterns is acquired, so that it is impossible to perform fast shape measurement.

SUMMARY OF THE INVENTION

Accordingly, the present invention has been made keeping in mind the above problems occurring in the prior art, and an object of the present invention is to provide a fast 3D shape measuring apparatus and method that is capable of minimizing the time that it takes to acquire a plurality of interference patterns by minimizing the setting time of the piezoelectric actuator, which is driven when moving a reference mirror in order to acquire a plurality of interference patterns.

For this purpose, the present invention is intended to capture an image in a first stable-state interval before the occurrence of maximum overshoot.

In order to accomplish the above object, the present invention provides an apparatus for measuring the shape of a 3D object using an interferometer, including a light source unit for emitting light; a beam splitter for dividing the light from the light source unit; a reference mirror for reflecting light, obtained through the division by the beam splitter, as a reference beam; an actuator for moving the reference mirror; an image pickup device for acquiring a plurality of interference patterns by causing the reflected beam, reflected from the object, and the reference beam to interfere with each other, the reflected beam and the reference beam being the beams that are obtained through the division by the beam splitter; and a control unit for measuring the shape of the object from the acquired interference patterns, outputting reference mirror drive signals to the actuator, and issuing an image capture command at the end of image capture time that is shorter than settling time.

The actuator may be a piezoelectric actuator.

The image pickup device may be a Charge-Coupled Device (CCD) camera.

The image capture time may be terminated at the time at which a stable-state interval is first reached after startup of piezoelectric actuator and before occurrence of maximum overshoot.

In order to accomplish the above object, the present invention provides a method of measuring the shape of a 3D object using an interferometer for obtaining a reference beam by moving a reference mirror using a piezoelectric actuator, the method comprising emitting light from a light source light; dividing the emitted light into a reference beam and a reflected beam to be reflected from the object; and acquiring a plurality of interference patterns by causing the reference beam and the reflected beam to interfere with each other; wherein the acquiring the interference patterns includes acquiring a plurality of interference patterns by repeatedly issuing an image capture command with driving time of the piezoelectric actuator for moving the reference mirror being set to a time shorter than settling time.

The image capture command may be issued at the time at which a stable-state interval is first reached after startup of piezoelectric actuator and before occurrence of maximum overshoot.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
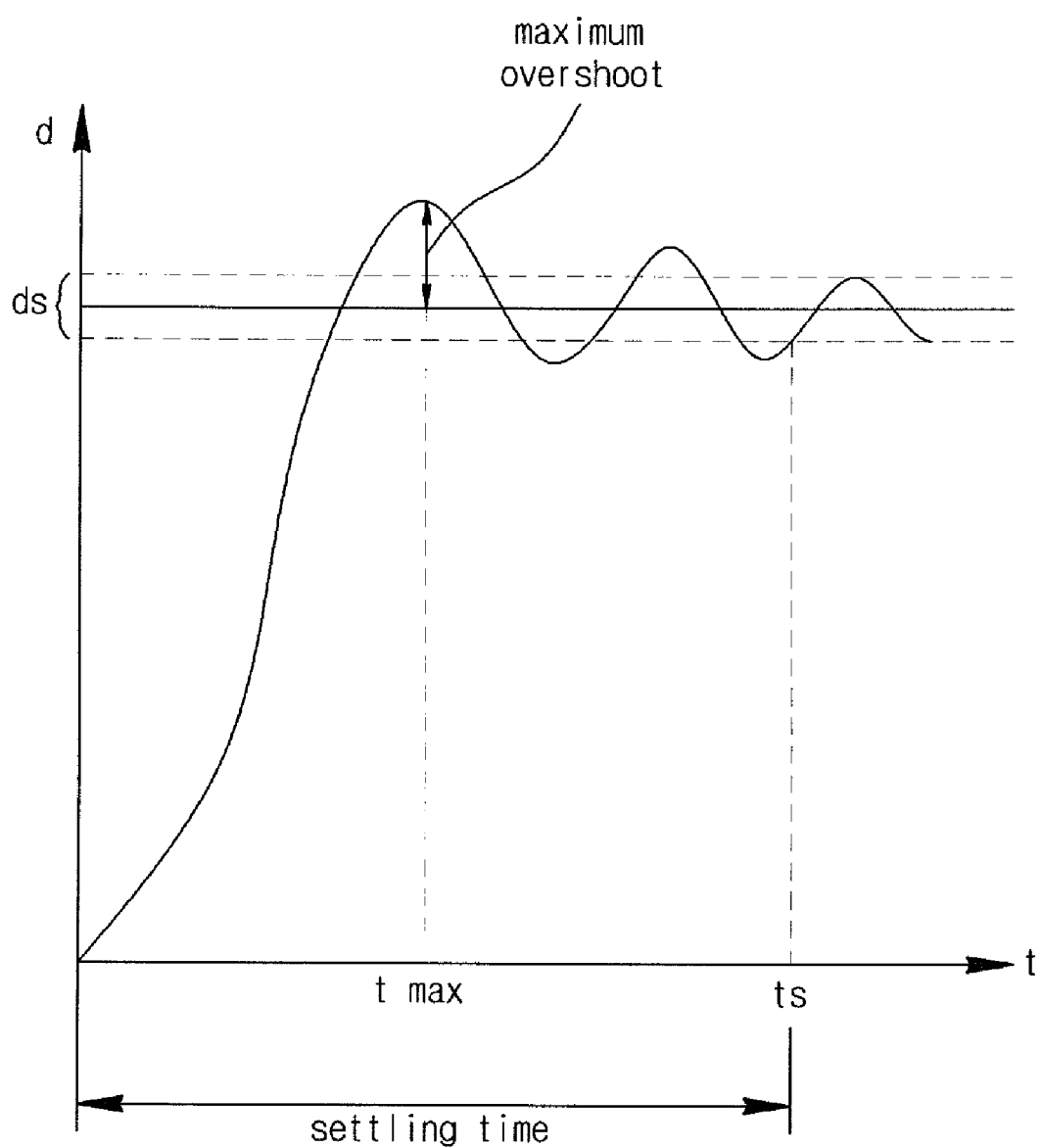
FIG. 1 is a graph showing the driving of a typical piezoelectric actuator.

Reference now should be made to the drawings, in which the same reference numerals are used throughout the different drawings to designate the same or similar components.

A preferred embodiment of the present invention will be described in detail below with reference to the attached FIGS. 2 to 4.

Figure 2:
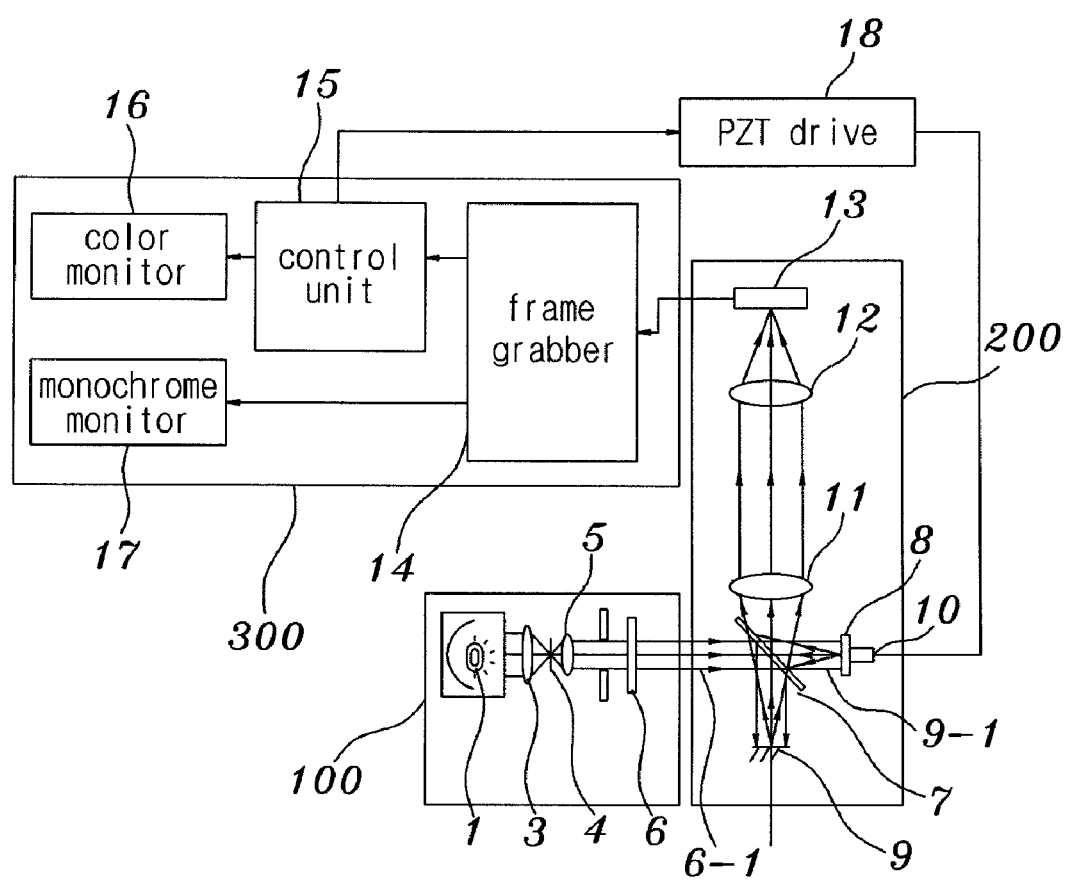
FIG. 2 is a block diagram showing a shape measuring apparatus according to an embodiment of the present invention.

FIG. 2 is a block diagram showing a shape measuring apparatus according to an embodiment of the present invention.

Referring to FIG. 2, the apparatus is divided into three units, that is, a light source unit 100 for emitting light, a measurement unit 200 for measuring an interference pattern, and a data processing unit 300 for measuring a 3D shape using the acquired interference pattern.

The light source unit 100 includes a halogen lamp 1, a focusing lens 3, a pinhole 4, a parallel light lens 5, and a color filter 6. The measurement unit 200 includes a beam splitter 7, a reference mirror 8, a piezoelectric actuator 10, an objective lens 11, an image lens 12, and a CCD camera 13. The data processing unit 300 includes a control unit 15, a frame grabber 14, a monochrome monitor 16, and a color monitor 17. Furthermore, a separate piezoelectric drive 18 for driving the piezoelectric actuator 10 is included, and is connected such that it can control the piezoelectric actuator 10 under the control of the control unit 15.

In FIG. 2, light emitted from the halogen lamp 1 of the light source unit 100 is converted into stable and parallel source light along a light path through the focusing lens 3, the pinhole 4 and the parallel light lens 5. Thereafter, this resulting source light is deprived of frequency components in unnecessary regions while passing through the color filter 6 of the light source unit 100, is converted into source light 6-1 suitable for measurement, and is then output. The source light 6-1 is divided into a reference beam 8-1 and a measurement beam 9-1 by the beam splitter 7, and the beams are incident on the reference mirror 8 and a test surface 9, respectively. The incident beams are reflected from the reference mirror 8 and the test surface 9, and are combined by the beam splitter 7. This resulting light passes through the objective lens 11 and the image lens 12, and forms an interference pattern on the CCD camera 13. Respective pixels of the CCD camera correspond to respective locations of a test surface in a 1:1 manner, and the shape information of a 3D object can be acquired using an interference pattern obtained from the respective pixels. Digital values corresponding to the interference pattern from the CCD camera 13 are stored in the frame grabber 14 of the data processing unit 300. In order to calculate shape information, a plurality of interference patterns is required.

Accordingly, the reference mirror 8 is moved by driving the piezoelectric actuator 10 using the piezoelectric drive 18, and a plurality of interference patterns is acquired through the above-described CCD camera 13. Digital values corresponding to these acquired interference patterns are input to the frame grabber 14, and 3D shape information can be acquired using the values. In this case, the control unit 15 applies drive signals to the piezoelectric drive 18 in order to drive the piezoelectric actuator 10. When the piezoelectric actuator 10 is driven, the reference mirror 8 is moved. After the movement of the reference mirror 8 has been completed, the control unit 15 issues an image capture command in order to acquire an interference pattern. By doing this, the interference pattern is acquired by the CCD camera 13. Whenever the piezoelectric actuator 10 is driven, the reference mirror 8 is moved, and then an interference pattern can be acquired in accordance with an image capture command from the control unit 15. These results may be displayed on the color monitor 16 or the monochrome monitor 17 in a graphic form, and thus the shape of a 3D object can be determined.

The driving of the piezoelectric actuator 10 will be described in detail below with reference to FIG. 3.

Figure 3:
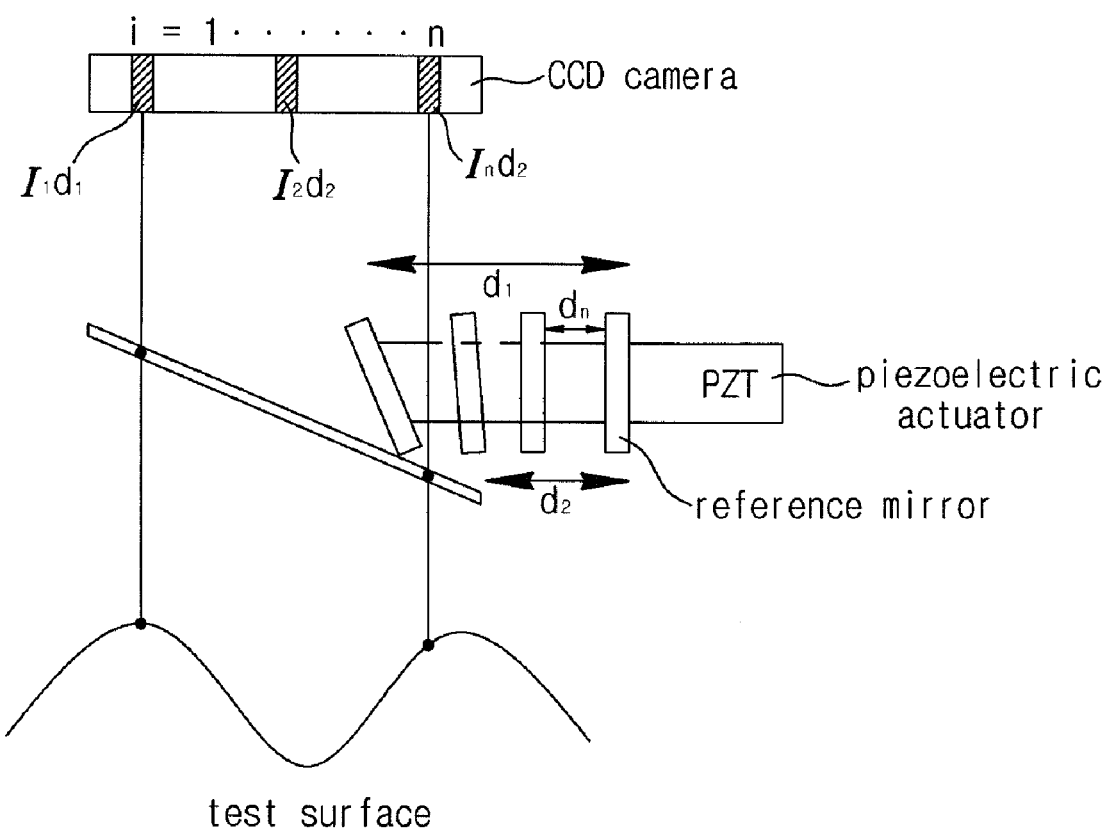
FIG. 3 is a diagram illustrating the driving of the piezoelectric actuator of the apparatus shown in FIG. 2.

FIG. 3 is a diagram illustrating the driving of the piezoelectric actuator of the apparatus shown in FIG. 2.

Referring to FIG. 3, a description related to FIG. 3 will be given below using an example in which a piezoelectric actuator and a reference mirror are integrated together. That is, when a drive signal is transmitted by the piezoelectric driver, the piezoelectric actuator moves the reference mirror. In this case, the moving distance of the reference mirror may be $d_1$, $d_2$, ..., or $d_n$, as shown in the drawing. When the movement of the reference mirror is completed, the interference pattern acquired from an image through the CCD camera varies depending on the measurement point i.

In FIG. 3, when the reference mirror is moved to a location $d_1$ and it is assumed that a relevant measurement point is 1, a relevant image may be called $I_1 d_1$. Furthermore, when the reference mirror is placed at a location $d_n$, a relevant measurement point is n, and thus a relevant image is $I_n d_n$. Accordingly, a plurality of interference patterns can be acquired through the CCD camera. In this case, the control unit 15 previously sets image capture time, during which the piezoelectric actuator moves the reference mirror to the location d1, sets the image capture time to a sufficiently short time, and issues an image capture command in order to acquire a plurality of interference patterns within the sufficiently short time.

Figure 4:
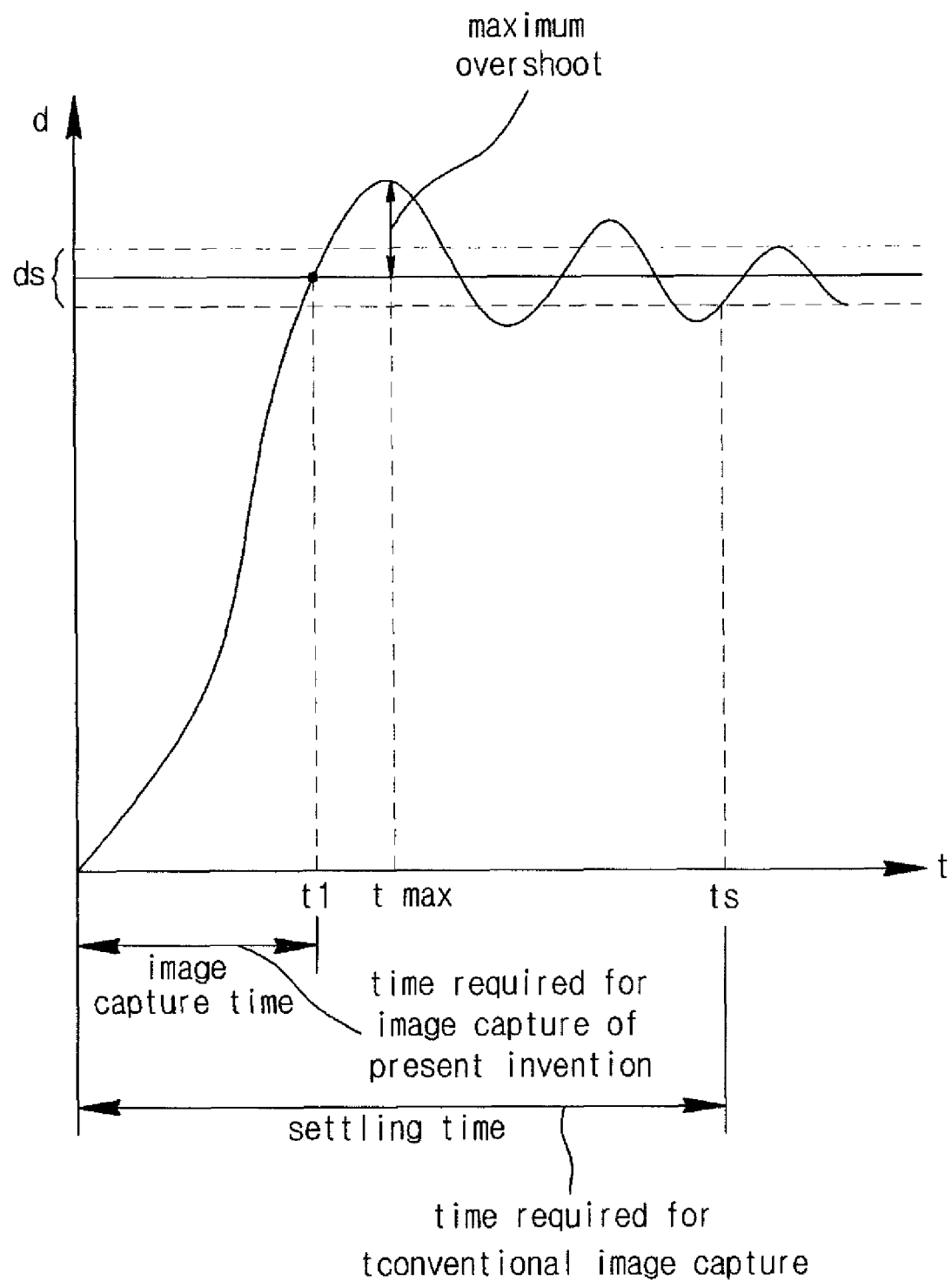
FIG. 4 is a graph showing the driving of the piezoelectric actuator of the present invention.

Referring to FIG. 4, the driving graph of the piezoelectric actuator is shown, and the horizontal axis thereof denotes time t and the vertical axis thereof denotes moving distance d. Existing settling time is denoted by ts, as illustrated in FIG. 1. That is, when movement over a specific distance is performed and the end of image capture time t1 is reached, an image capture command is issued to acquire an image without waiting for the end of the settling time ts. That is, the control unit 15 outputs a drive signal for moving the reference mirror 8 to the piezoelectric actuator 10 through the piezoelectric drive 18, checks the image capture time of the piezoelectric actuator 10, and outputs an image capture command to the frame grabber 14 at the end of the preset image capture time t1. Then, the frame grabber 14 can acquire an image based on a relevant interference pattern from the CCD camera 13. Through the repetition of the above-descried process, image signals can be acquired from a plurality of interference patterns. The control unit 15 performs control so that an image capture command is applied at the end of the image capture time t1, based on a drive command from the piezoelectric actuator 10. Here, the image capture time is the time that can be calculated by those skilled in the art from the driving characteristics of the piezoelectric actuator through experiments, and a detailed description thereof is omitted in the embodiment of the present invention.

Here, the image capture time is the time that is well known based on the characteristics of the piezoelectric actuator 10, is acquired through experiments, and refers to the time ranging to a first steady-state interval 'ds' before the occurrence of the maximum overshoot. The time ranging to the interval is set as the image capture time, and the control unit 15 issues an image capture command at the end of the interval.

Referring to FIG. 4, the image capture time is the time that is required for image capture by the present invention, while the settling time is the time required for existing image capture. That is, it can be seen that the time required for image capture by the present invention is shorter than the time required for existing image capture.

Accordingly, whenever each interference pattern is acquired, 3D shape information can be acquired at a fast speed thanks to the short image acquisition time.

Accordingly, the present invention minimizes the time required for the acquisition of a plurality of interference patterns for the measurement of a 3D shape, thereby providing an effect of enabling fast shape measurement.

Furthermore, the present invention allows an image and then an interference pattern to be acquired at a desired location while the piezoelectric actuator is driven, thereby providing effects of enabling the adjustment of time and reducing errors attributable to time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for measuring a shape of a three-dimensional object using an interferometer, comprising:
    a light source unit for emitting light;
    a beam splitter for dividing the light from the light source unit into a reference beam and an object beam;
    a reference mirror for reflecting the reference beam;
    an actuator for moving the reference mirror;
    an image pickup device for acquiring a plurality of interference patterns by causing the object beam, after reflection from an object, and the reference beam, after reflection from the reference mirror, to interfere with each other; and
    a control unit for measuring the shape of the object from the acquired interference patterns, outputting reference mirror drive signals to the actuator, and issuing an image capture command at an end of an image capture time that is shorter than a settling time.

2. The apparatus as set forth in claim 1, wherein the actuator is a piezoelectric actuator.

3. The apparatus as set forth in claim 1, wherein the image pickup device is a Charge-Coupled Device camera.

4. The apparatus as set forth in claim 2, wherein the image capture time is terminated at a time at which a stable-state interval is first reached after a startup of the piezoelectric actuator and before an occurrence of maximum overshoot.

5. A method of measuring a shape of a three-dimensional object using an interferometer which obtains a reference beam by moving a reference mirror using a piezoelectric actuator, the method comprising:
    emitting light from a light source light;
    dividing the emitted light into a reference beam and an object beam; and
    acquiring a plurality of interference patterns by causing the reference beam and the object beam to interfere with each other,
    wherein the acquiring the plurality of interference patterns includes repeatedly issuing an image capture command based on a driving time of the piezoelectric actuator for moving the reference mirror, the driving time set to a time shorter than settling time.

6. The method as set forth in claim 5, wherein the image capture command is issued at a time at which a stable-state interval is first reached after a startup of piezoelectric actuator and before an occurrence of maximum overshoot.

* * * * *